Oct. 25, 1932.　　　G. G. FORD　　　1,884,645
WELDING APPARATUS
Filed Aug. 28, 1931　　2 Sheets-Sheet 1

Inventor
George G. Ford
By E. A. Wagonseller Atty.

Oct. 25, 1932.  G. G. FORD  1,884,645
WELDING APPARATUS
Filed Aug. 28, 1931   2 Sheets-Sheet 2

Inventor
George G. Ford
By E. A. Wagonseller
Atty.

Patented Oct. 25, 1932

1,884,645

UNITED STATES PATENT OFFICE

GEORGE G. FORD, OF TERRE HAUTE, INDIANA

WELDING APPARATUS

Application filed August 28, 1931. Serial No. 559,857.

This invention relates to welding apparatus and more particularly to apparatus of this character for use with electrical welding tools. One object of the invention is the provision of an improved welding apparatus of an efficient and dependable character particularly adapted for continuous mechanical welding of curved joints and more especially of joints having an irregular curvature. A more specific object of the invention is the provision of an improved guiding or stabilizing mechanism adapted to increase the accuracy of travel of the welding tool in machines of the type described and claimed in my copending application Ser. No. 423,305, filed January 25, 1930.

To these and other ends the invention resides in certain improvements and combinations of parts, all as will be hereinafter more fully described, the novel features being pointed out in the claims at the end of the specification.

In the drawings.

Similar reference numerals throughout the several views indicate the same parts.

Figure 1:
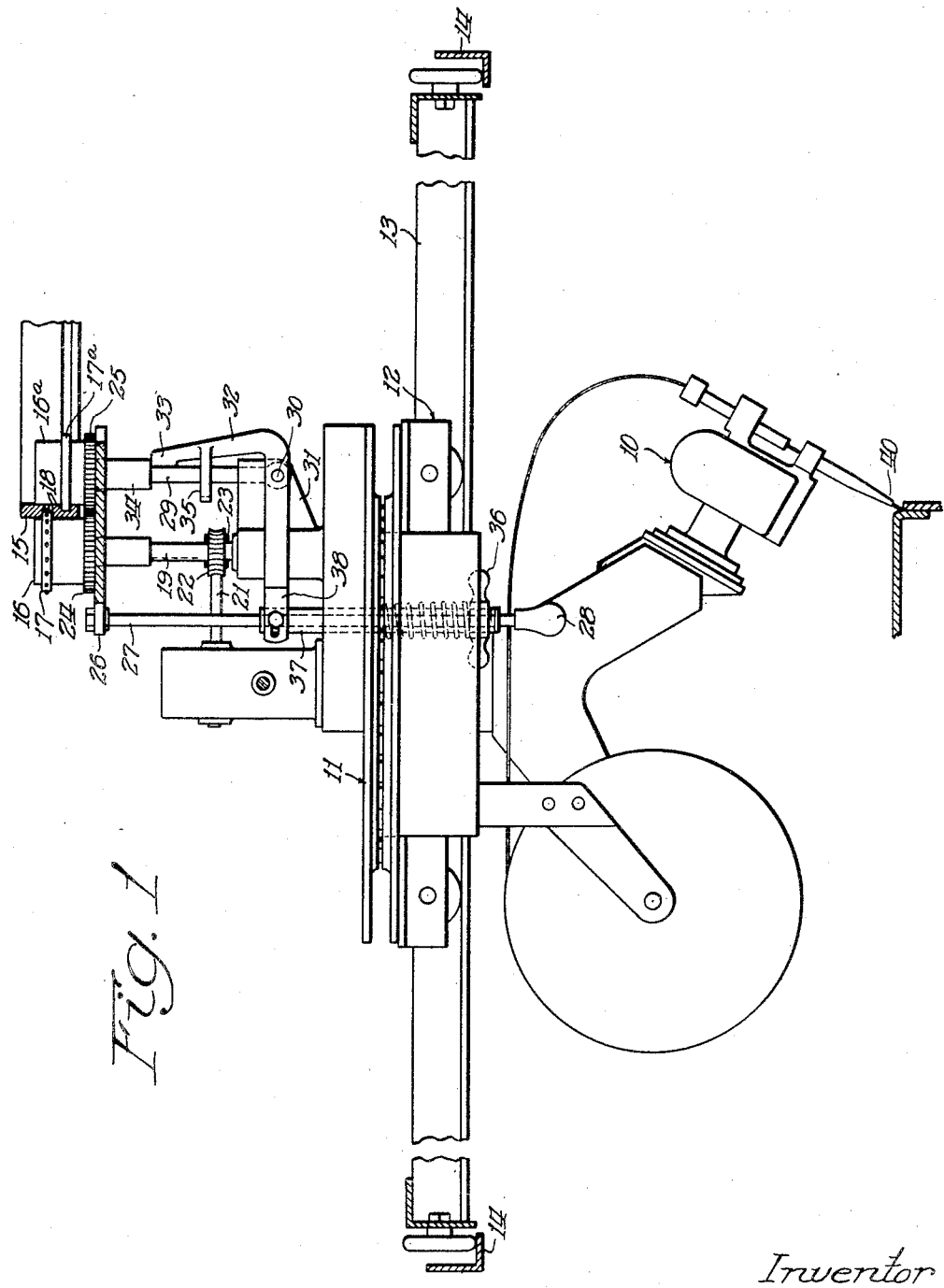
Fig. 1 is a side elevation of a welding machine embodying the present invention.

The present invention provides a guiding means or a stabilizing device capable of effecting accurate control of the welding tool in mechanical welding devices of the type in which the path of the tool is determined by the utilization of a guide rail or track of predetermined form. The stabilizing device is positioned in symmetrical relationship to the tool and to the guide rail so as to insure maximum accuracy of the tool with respect to the work along various types of irregularly curved paths either circular in form or otherwise. While the device illustrated in my copending application above referred to, is entirely satisfactory for most types of work I have found that the present guiding means affords a somewhat more accurate control with a wider variation in the curvature of the joint to be welded especially in the case where the joint to be welded contains reverse curves such as S-curves.

Referring more particularly to the drawings illustrating a preferred embodiment of the present invention, the welding tool 10 is mounted for free rotative or angular movement on a rotary support or turntable 11 rotatably mounted on a supporting means in the form of a carriage 12, mounted so as to be freely movable along a traveling support 13 which, in turn, is mounted for movement on suitable tracks 14, which are preferably stationary. A guide track 15, suitably supported, cooperates, through the intermediary of traction and guide means mounted in fixed relation to the tool, to maintain the tool in proper working position with respect to the joint to be welded.

The traction means preferably comprises a pair of driven rollers 16, 16a provided with tread rings 17, 17a received in notches 18 of the guide track 15. The roller 16 is slidably keyed on a shaft 19 which is driven from a motor 20 through shaft 21 and gears 22 and 23. A pinion 24, fixed with respect to the roller 16, meshes with a similar pinion 25, fixed to the roller 16a.

The rollers 16, 16a may be spread apart to disengage them from the track and also may be raised or lowered. For this purpose there is provided a supporting member in the form of a plate 26 secured at one end to a vertical rod 27 passing down through the top of turntable 11 and terminating in a suitable handle 28 by means of which the rod may be raised or lowered. The roller 16a is rotatable upon a spindle 29 horizontally pivoted at 30 in a bracket 31. A yoke 32 is also pivoted at 30 and has an upper portion 33 capable of contacting the spindle 29 to hold the same in vertical position.

The upper end of the part 33 of the yoke engages under a hub 34 of the roller 16a thus positively maintaining the plate 26, with the rollers 16, 16a, in raised position. The plate 26 is suitably slotted to permit swinging movement of the hub 34 with the spindle 29 so as to separate the rollers sufficiently to permit them to be disengaged from the track. The spindle 29 is swung by means of a bridging piece 35 located on the yoke member whereby when the yoke is rocked to the right as shown in Fig. 1, it will positively pull the spindle to the right and at the same time the upper end 33 of the yoke will be disengaged from under the hub 34. A suitable handle 36 is secured to a hollow rod 37 which surrounds the rod 27 which is pivotally engaged with the horizontal arm 38 of the yoke. By means of the handle 36 the yoke may be rocked on its pivot 30.

The mechanism thus far described is, in all major respects, substantially like that disclosed in my copending application above referred to.

As the center of inertia of the system, including the turntable 11 and the supports 12 and 13, is offset with respect to the tractive point of the traction rollers 16, 16a, it is desirable to provide guiding or stabilizing means to counteract the tendency of the center of the turntable to become displaced with respect to a line at right angles to a tangent to the guide track, drawn through the point of contact of the rollers 16, 16a. For this purpose there is provided a pair of symmetrically disposed contact members for engaging the track 15, positioned in spaced relation to the traction means but closely adjacent thereto and in substantial vertical alignment with the working end 40 of the welding tool. These contact members, designated at 41, 42 are preferably in the form of small rollers positioned to engage the lower portion of the guide track 15.

Means are provided for yieldingly holding the contact members or rollers 41, 42 against the track 15 and additional means are provided for effecting the disengagement of the contact members from the track. For this purpose the supporting plate 26 is provided with an extension 43 upon which a pair of arms 44 and 45 is pivotally mounted at 46 and 47, respectively, the pivots being preferably symmetrically disposed with respect to the axes of the traction rollers 16, 16a, in their normal position in engagement with the track 15. The arms 44 and 45 may have any suitable configuration but, for convenience of assembly and for the purpose of providing sufficient clearance, they are made somewhat L-shaped.

Figure 2:
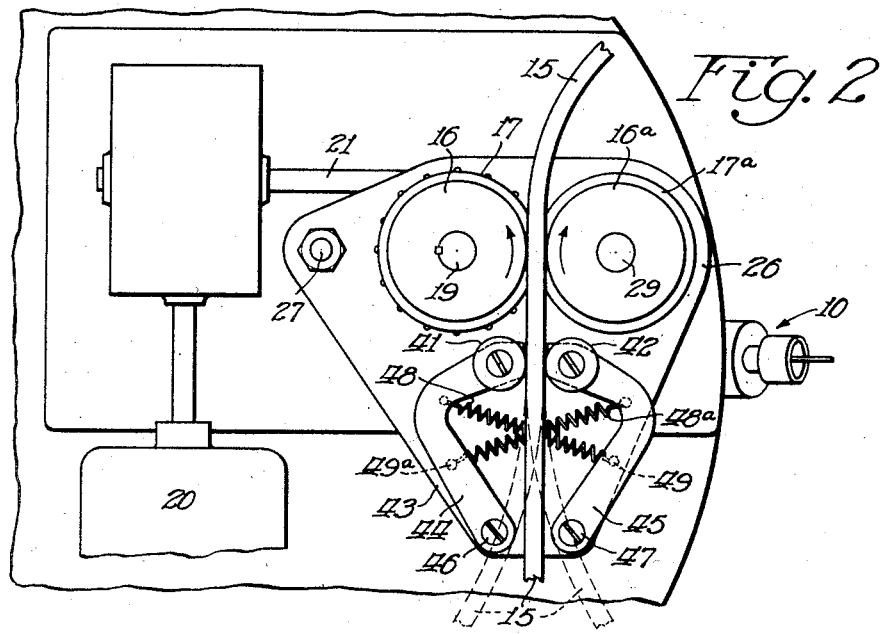
Fig. 2 is a detail plan view illustrating the novel guide means for maintaining the tool in proper alignment.
Figure 4:
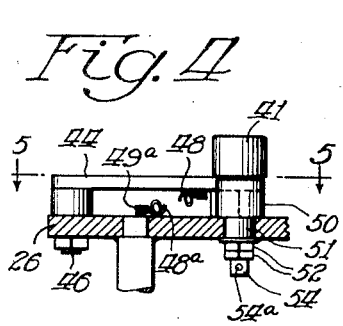
Fig. 4 is a detail view taken substantially along line 4—4 of Fig. 3.
Figure 3:
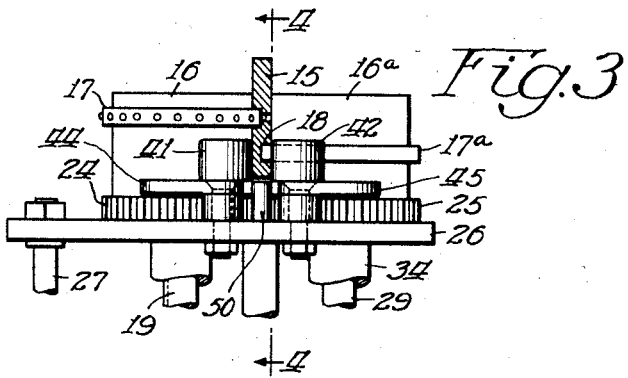
Fig. 3 is a fragmentary detail in elevation showing the relative arrangement of the traction rollers and stabilizing rollers.

Any suitable means may be employed for tensioning or yieldingly urging the rollers 41 and 42 toward each other so as to grip the track between them. In the present instance this means is preferably in the form of a pair of coil springs 48, 48a. The coil spring 48 has one end engaged in the arm 44 and its other end secured to a suitable anchor lug 49 on the supporting plate 26. The other spring 48a has an end secured in the arm 45 and its other end engaged in a similar anchor lug 49a on the supporting plate 26. (See Figs. 2 and 4.) In this manner the contact members or rollers 41 and 42 are independently urged toward each other.

The means for disengaging the contact members 41 and 42 from gripping relation with respect to the track is preferably manually actuated. For this purpose there is provided a member 50 in the form of an elongated, oval cam (see Fig. 4) which also serves as a stop in a manner presently to be described. This cam 50 has a shank 51 pivotally mounted in a suitable aperture in the plate 26 and held therein by means of suitable nuts 52, 52 on its threaded end. A squared portion 54 on the end of the cam member is provided by means of which the cam member may be swung or rotated by a suitable tool. As an alternative means for rotating the member 50, a hole 54a may be drilled in the end 54 to receive a suitable pin or nail to assist in hand turning. By reference to Fig. 4 it will be seen that the square end 54 is accessible from the under side of the supporting plate 26.

The member 50 also serves in a capacity of a stop to render one or the other of the contact members inoperative under certain conditions of the curvature of the guide track. For this purpose the arms 44 and 45 are each provided with an abutment surface 56 and 57, respectively, spaced inwardly from the periphery of the rollers 41 and 42 a small distance, preferably about $\frac{1}{32}$ of an inch where the member 50 is about three eighths of an inch thick and the guide track about five sixteenths of an inch thick, at a point along which the rollers 41 and 42 are adapted to travel.

The operation of the device is as follows:

Assuming that the device is traveling along a straight portion of the guide track, there will be a tendency of the center of the turntable (which is substantially the center of the system) to lag, but this tendency is counteracted by the tension of the contact member or roller 42 against the track. So long as the device is traveling along a straight portion of the guide track or along curves to the left, looking in the direction of movement, or along a curve to the right, having a radius less than the distance between the center of the turntable and the guide track, there will always be a tendency for the turntable center to lag behind a line perpendicular to the tangent to the guide track drawn through the point of contact of the rollers 16, 16a. As the tension on the springs 48 and 48a is substantially equal the rollers 41 and 42 will bear against the track with about equal force. Therefore, in the cases given, the center of the turntable will drop slightly behind the line referred to above, which causes a relative movement between the stop 50 and the track sufficient to cause the end of arm 44 to contact the stop, thus rendering spring 48 inoperative and causing the entire tension of spring 48a to be exerted upon the track through roller 42; thus the roller 42 will prevent the tendency of the turntable to lag more than an insignificant distance.

When the device reaches a portion of the guide track which curves sharply to the right, looking in the direction of movement, there will be a tendency for the center of the turntable to move toward the rear. The theoretical point at which this occurs in an irregularly curved track is that point of the track at which its radius becomes less than the distance of the center of the turntable from the point of contact with the rollers 16, 16a. In this case the roller 41, under the influence of spring 48, will prevent more than a very small amount of the lag in the movement of the center of the turntable to the rear. The reason for this is that when a lag occurs sufficient to cause the stop 50 to move relative to the track so as to come in contact with the end of arm 45, then the roller 41 alone will be bearing against the track and the full force of spring 48 will be exerted to prevent the lagging effect. Thus, whenever the lagging effect in one direction or the other becomes so pronounced as to actually cause a lag of the center of the turntable back of its proper direction of movement, the respective rollers 41 or 42 will either act or become inoperative so as to apply the entire reaction effect of the appropriate spring in a direction to correct the lag.

Figure 5:
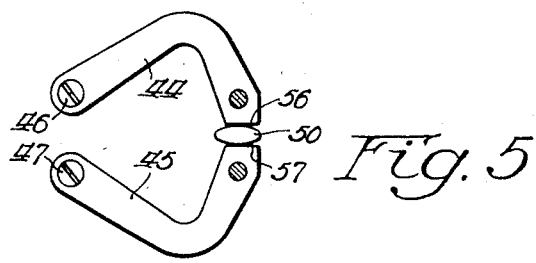
Fig. 5 is a view taken along line 5—5 of Fig. 4 and showing the arms for supporting the stabilizing rollers.

When it is desired to remove the traction device and stabilizing rollers from contact with the track—this is done by releasing the yoke 32 from beneath the hub 34 in the manner described in my copending application above referred to, after which the rollers 41 and 42 are spread apart by rotating the combined cam and stop member 50 at right angles to its position as indicated in Fig. 5, whereupon the rod 27 may be lowered so as to allow both the traction rollers and stabilizing rollers to drop down to a position below the track. When the rollers have been moved to a lowered position, the entire device may be moved along so as to permit it being operatively associated with another guide track below which an article to be welded has been placed in readiness for the welding operation. Thus, with a pair of guide tracks, of a desired configuration, the machine may be moved away from a complete welding job and started on a new welding operation with a minimum of loss of time.

In any event, the welding device may be readily removed from its position above a completed welding operation, such as a boiler, so that a crane may be moved in place and the article lifted and carried away while the welding device is in the clear to avoid any possible damage being done.

It is thus apparent that the present invention provides a device for moving a welding tool along paths of irregular curvature so that the tool is constantly maintained in a position of maximum accuracy with respect to the work.

While the present description sets forth a preferred embodiment of the invention, numerous changes may be made in the construction without departing from the spirit of the invention, and it is therefore desired that the present embodiment be considered in all respects as illustrative and not restrictive, reference being had to the appended claims rather than to the foregoing description to indicate the scope of the invention.

I claim:

1. A welding apparatus comprising in combination a welding tool, a rotary support for said tool, supporting means for said rotary support on which the latter is adapted to move throughout a substantial area, a guide track, traction means connected in fixed relation to said tool and adapted to propel said tool along the guide track, guiding means for maintaining the working point of the tool in proper relation to the work, said means comprising a pair of contact members symmetrically disposed relative to said track and the working point of said tool, said contact members being independently movable toward and from said track, and tensioning means associated with said contact members whereby each member is normally held in snug engagement with said track.

2. A welding apparatus comprising in combination a welding tool, a rotary support for said tool, supporting means for said rotary support on which the latter is adapted to move throughout a substantial area, a guide track, traction means connected in fixed relation to said tool and adapted to propel said tool along the guide track, guiding means for maintaining the working point of the tool in proper relation to the work, said means comprising a pair of contact members symmetrically disposed relative to said track and the working point of said tool, said contact members being independently movable toward and from said track, tensioning means associated with said contact members whereby each member is normally held in snug engagement with said track, and means for positively moving said contact members out of engagement with said track.

3. A welding apparatus comprising in combination a welding tool, a rotary support for said tool, supporting means for said rotary support on which the latter is adapted to move throughout a substantial area, a guide track, traction means connected in fixed relation to said tool and adapted to propel said tool along the guide track, guiding means for maintaining the working point of the tool in proper relation to the work, said means comprising a pair of rollers symmetrically mounted relative to said track and the working point of said tool, said rollers being independently movable into and out of engagement with said track, and tensioning means associated with said rollers whereby each roller is normally held in snug engagement with said track.

4. A welding apparatus comprising in combination a welding tool, a rotary support for said tool, supporting means for said rotary support on which the latter is adapted to move throughout a substantial area, a guide track disposed in a plane spaced from and substantially parallel to the path of movement of said tool, traction means connected in fixed relation to said tool and adapted to propel said tool along the guide track, guiding means for maintaining the working point of the tool in proper relation to the work, said means comprising a pair of contact members symmetrically disposed on each side of a vertical line through said track and the working point of said tool, said contact members being independently movable toward and from said track, and tensioning means associated with said contact members whereby each member is normally held in snug engagement with said track.

5. A welding apparatus comprising in combination a welding tool, a rotary support for said tool, supporting means for said rotary support on which the latter is adapted to move throughout a substantial area, a guide track disposed in a plane substantially parallel to the plane of movement of said tool, traction means connected in fixed relation to said tool and adapted to propel said tool along the guide track, guiding means for maintaining the working point of the tool in proper relation to the work, said means comprising a supporting member fixed relatively to the tool, a pair of arms pivotally mounted on said support at spaced points symmetrically disposed relative to the working point of the tool and to the point of contact of the traction means with the track and offset with respect to the vertical line through the working point of the tool in the general line of travel thereof, a contact member supported on each of said arms substantially equidistant from the pivotal points thereof and adapted to engage the track on opposite sides, tensioning means associated with said contact members adapted to cause said members to approach each other and grip the track between them, and mean for causing relative movement of said contact members away from each other whereby they will be disengaged from the track.

6. A welding apparatus comprising in combination a welding tool, a rotary support for said tool, supporting means for said rotary support on which the latter is adapted to move throughout a substantial area, a guide track disposed in a plane substantially parallel to the plane of movement of said tool, traction means connected in fixed relation to said tool and adapted to propel said tool along the guide track, guiding means for maintaining the working point of the tool in proper relation to the work, said means comprising a supporting member fixed relatively to the tool, a pair of arms pivotally mounted on said support at spaced points symmetrically disposed relative to the working point of the tool and to the point of contact of the traction means with the track and offset with respect to the vertical line through the working point of the tool in the general line of travel thereof, a contact member supported on each of said arms substantially equidistant from the pivotal points thereof and adapted to engage the track on opposite sides, tensioning means associated with said contact members adapted to cause said members to approach each other and grip the track between them, and means for causing relative movement of said contact members away from each other whereby they will be disengaged from the track, said means comprising abutment surfaces on said arms and a cam pivotally mounted on said support and adapted to engage said abutment surfaces whereby partial rotation of said cam in contact with said abutment surfaces will produce uniform separating movement of said contact members.

7. A welding apparatus comprising in combination a welding tool, a rotary support for said tool, supporting means for said rotary support on which the latter is adapted to move throughout a substantial area, a guide track disposed in a plane substantially parallel to the plane of movement of said tool, traction means connected in fixed relation to said tool and adapted to propel said tool along the guide track, guiding means for maintaining the working point of the tool in proper relation to the work, said means comprising a supporting member fixed relatively to the tool, a pair of arms pivotally mounted on said support at spaced points symmetrically disposed relative to the working point of the tool and to the point of contact of the traction means with the track and offset with respect to the vertical line through the working point of the tool in the general line of travel thereof, a contact member supported on each of said arms substantially equidistant from the pivotal points thereof, independent tensioning means associated with said contact members adapted to move them on said supporting member in the direction of the track so as to grip the track between them, and means for causing relative movement of said contact members away from each other whereby they will be disengaged from the track.

8. A welding apparatus comprising in combination, a welding tool, a rotary support for said tool, supporting means for said rotary support on which the latter is adapted to move throughout a substantial area, a guide track, traction means for said tool, a vertically movable support for said traction means, means for maintaining said support in fixed relation to said tool during its vertical movement, said traction means comprising rollers mounted on said support to move therewith, means for causing said rollers to grip said guide track to enable said rollers to propel the tool therealong, driving means for said rollers, guiding means for maintaining the working point of the tool in proper relation to the work, said guiding means including a pair of arms pivotally mounted at spaced points on said vertically movable support and symmetrically disposed relative to the working point of the tool and to the point of contact of the traction means with the track and offset with respect to the vertical line through the working point of the tool in the general line of travel thereof, a roller journalled on each of said arms substantially equidistant from the pivotal points thereof, tensioning means associated with said support and said arms adapted to cause the rollers on said arms to approach each other and grip the guide track between them, means for causing relative movement of said guide rollers away from each other whereby they will no longer grip the track, and means for effecting relative separating movement between said traction rollers whereby said vertically movable support and the rollers thereon may be lowered away from contact with said guide track when both sets of rollers are in separated relation.

9. A welding apparatus according to claim 8, in which the means for causing relative movement of said guide rollers comprises a cam disposed beneath said guide track and rotatably mounted in said vertically movable support, said cam being elongated with its lesser dimension slightly greater than the spacing of the surfaces of the guide track along which the guide rollers travel, and the arms supporting said guide rollers having their ends terminating slightly inward from the periphery of said guide rollers whereby when the guide rollers are in engagement with the track the ends of said arms will be slightly spaced from said cam.

10. A welding apparatus comprising in combination a welding tool, a rotary support for said tool, supporting means for said rotary support on which the latter is adapted to move throughout a substantial area, a guide track disposed in a plane substantially parallel to the plane of movement of said tool, traction means connected in fixed relation to said tool and adapted to propel said tool along the guide track, guiding means for maintaining the working point of the tool in proper relation to the work, said means comprising a supporting member, fixed relatively to the tool, a pair of arms pivotally mounted on said support at spaced points symmetrically disposed relative to the working point of the tool and to the point of contact of the traction means with the track and offset with respect to the vertical line through the working point of the tool in the general line of travel thereof, a contact member supported on each of said arms substantially equidistant from the pivotal points thereof, tensioning means associated with said contact members and adapted to move them on said support in the direction of the track and means associated with said contact means for rendering a selected contact means inoperative when, as the traction means is traveling along a portion of the track curving in a direction of travel toward a side opposite to which said selected contact means is located, the radius of curvature of the track becomes substantially less than the distance between the center of rotation of such rotary support and the point of contact of the traction means with the guide track.

Signed at Terre Haute, Indiana this 7th day of Aug., 1931.

GEORGE G. FORD.